(12) United States Patent
Trovato

(10) Patent No.: US 6,909,746 B2
(45) Date of Patent: Jun. 21, 2005

(54) FAST ROBUST DATA COMPRESSION METHOD AND SYSTEM

(75) Inventor: Karen I. Trovato, Putnam Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 774 days.

(21) Appl. No.: 09/823,486

(22) Filed: Mar. 30, 2001

(65) Prior Publication Data

US 2002/0141497 A1 Oct. 3, 2002

(51) Int. Cl.[7] .................................................. H04B 1/66
(52) U.S. Cl. .................. 375/240.03; 375/245; 375/265; 348/390; 348/405; 704/229; 704/230; 382/233; 382/235; 382/251
(58) Field of Search ............................ 375/240, 240.01, 375/240.02, 240.05, 240.08, 244, 256, 245, 255, 265; 348/384, 390, 404, 405; 704/222, 229, 230, 500, 503; 382/232, 233, 235, 238, 239, 244, 251, 307

(56) References Cited

U.S. PATENT DOCUMENTS 5,103,306 A * 4/1992 Weiman et al. .......... 348/400.1
5,778,192 A 7/1998 Schuster et al. ........ 395/200.77
5,995,670 A * 11/1999 Zabinsky .................... 382/242
6,252,989 B1 * 6/2001 Geisler et al. .............. 382/232

FOREIGN PATENT DOCUMENTS

| EP | 0798928 A2 | 10/1997 | ............ H04N/7/30 |
| EP | 0810792 A2 | 12/1997 | ............ H04N/7/26 |
| FR | 2778039 A | 10/1999 | ............ H03M/7/30 |

* cited by examiner

Primary Examiner—Dac V. Ha
(74) Attorney, Agent, or Firm—Gregory L. Thorne

(57) ABSTRACT

A video compression process speeds the optimal choice of quantizers for compressing a data stream by setting up the optimization problem as a path-optimization problem in configuration space and finding the lowest cost path through the configuration space. The process begins with a starting node (or "state") and propagates least-cost waves through the space until a path is completed to the end. The process may continue using uncompleted paths while their costs are less than the end state, beginning with the lowest cost incomplete path, until an improved path is found. The process may further continue, for a time constrained process, until time runs out or all useful possibilities are exhausted.

22 Claims, 4 Drawing Sheets

FAST ROBUST DATA COMPRESSION METHOD AND SYSTEM

BACKGROUND OF THE INVENTION

1. Field of the Invention

The invention relates to data compression and in particular, compression schemes which seek to make more efficient compression processes that attempt to select optimal quantizers.

2. Background

Storing and transmitting large amounts of data is a perennial problem. For example, the amount of data in a digitized video is tremendous and would choke the storage and transmission capacities of most devices if there weren't practical ways to throw away redundant and unimportant information. This is the business of data compression; one simply doesn't bother to store or transmit the information about the data stream that can be predicted fairly accurately. If prediction is 100% accurate, then the compression scheme is called "lossless." If it is less than 100% accurate, it is called "lossy."

Compression of data streams is also used in other environments. For example, images can be compressed in a lossy way. One well-known type of image compression, Joint Photographic Experts Group (jpeg), takes advantage of correlation between neighboring pixels to predict their values and thereby reduce the quantity of data that must be stored or transmitted for a given quality level. There are many other lossy image compression schemes.

Lossy schemes, by definition, cannot generate perfect distortionless representations of their antecedents. In many compression schemes, it is possible to pre-select an allowed maximum distortion level and store or transmit the minimum amount of data ("bit-rate") required to provide it. Alternatively, the bit-rate can be pre-selected and the distortion minimized for the specified "bit-budget."

Distortion is a concept that depends on the type of data compression and can involve subjective criteria. For example, the degree of distortion suffered in a given compression/decompression cycle depends, in part, on aspects of the human visual system. For example, humans do not see color, for example, at the same detail as luminance (the relative lightness and darkness of portions of an image). As a result, distorting a data stream so that those data that contribute the least to perceived quality are thrown out before those that contribute more to perceived quality is an optimal approach to compression. (Obviously, data that contribute nothing to image quality—i.e. they are redundant—would be at the top of this list.) This approach to compression defines an "optimization problem" called "optimal bit allocation" for "rate-distortion compression." Besides the subjective notions of what defines optimality, there are other more concrete aspects to optimality. For example, one could choose to minimize the average distortion, sacrificing some portions of the data stream to enhance others to achieve an overall optimum. Alternatively, one could minimize the maximum distortion of every specified portion of the data stream. What defines optimality is thus a complex and evolving concept and is intended, in the instant specification, to refer to any specific metric.

It has long been known that video data is a superb candidate for compression with little perceptual distortion. The technical way of saying this is that the raw data has very low entropy; that is, any given portion in time and or space is predictable with high probability from other portions in time and space. For example, a first frame tends to look a great deal like the next frame, even in a fast-paced video sequence.

A great variety of different schemes have been created for compactly defining video. For example, a video frame can be defined in terms of where each of the segments of the image moved from the previous frame plus a "difference" frame that contains only the details lost by reconstructing the frame from just the motion data. Compression schemes that use this technique are called Motion Compensated Video Coders (MCVC). The combined data stream may be highly compact because much of the change in successive frames of a video can be characterized by gradually shifting fields of color and luminance.

Many of the different schemes for compressing video data may be used in concert. There are also many methods for compressing audio, still image, and other kinds of data. The optimization problem can be complicated for these so-called predictive schemes in which information is gathered from portions of the signal that are adjacent either in time or space. Inherent in any compression scheme is the substitution of raw data by some symbol which represents that data. For example, when a single datum is converted to digital data, the transmitter (or storage device) must resolve the tradeoff between precision and waste. More precision requires more data. This is a simple illustrative choice between different "quantizers." Modern data compression problems involve much more complex choices. For example, in MCVCs, which represent a video stream by transmitting the movement of a portion of the video frame, the choice of quantizers may involve selecting the size of the portion that can be effectively represented by motion vectors. The choice of how to divide up one frame into moving portions affects the prediction value for the next successive frame. The result is that the amount of distortion accrued in a temporal, or spatial, succession of choices of how to translate raw data into symbols results in a complex planning problem where the choices of quantizers for one portion of the data stream affects the distortion (or bit-rate) for other portions of the data stream. That is, the quantizers are dependent.

In some video compression schemes, the use of a tool called dynamic programming (DP) has been proposed to solve the optimization problem posed by such compression schemes. While DP is robust (i.e., it always works), it is computationally intensive. The result is that either the quality of the optimization must suffer or the cost of computing the optimum must be high. Thus, there is a need in the prior art for ways of addressing the optimization problem posed by rate-distortion compression schemes with lower computational overhead.

SUMMARY OF THE INVENTION

Briefly, a video compression process optimizes the choices of quantizers for compressing a data stream by setting up the optimization problem as a path-optimization problem in a directed graph and finding the lowest cost path through the directed graph. The directed graph can also be considered as a configuration space. The process begins with a starting node (or "state") and propagates least-cost waves through the space until a path is completed to the end. The process may continue using partial paths, beginning with the lowest cost incomplete path, until a further path is completed. The lower cost partial or uncompleted path can be compared and the optimal used. The process may further continue, for a time-constrained process, until time runs out or all possibilities that may contribute to an optimal path are exhausted.

The compression scheme begins with a constrained optimization problem arising where quantizers are selected to optimize rate or distortion during lossy compression of the data stream. As in the prior art, the scheme attempts to optimize the rate-distortion by choosing either the lowest bit rate for a given maximum distortion or the lowest distortion for a given maximum bit rate. However, according to the invention, this optimization problem is solved using a path optimization known as A* path-planning, which allows several benefits. First, in contrast to dynamic programming, it allows continual improvement of near-optimal paths to be obtained in a time-constrained environment because it uses an admissible heuristic (optimistic estimate) to guide the way toward the global optimal path. Second, it can optimize all possible paths without exhaustive expansion and is thereby more computationally efficient than dynamic programming.

In general, according to the invention, the optimization of the quantizers is translated into a path-optimization problem, which is then solved using A* path-planning. A* path-planning is described in a number of publications including the following, which are each hereby incorporated by reference as if fully set forth, in their entireties, herein.

U.S. Pat. No. 5,220,497 Method and apparatus for controlling high speed vehicles;

U.S. Pat. No. 5,083,256, entitled: Path-planning with transition changes;

U.S. Pat. No. 4,949,277, entitled: Differential budding: method and apparatus for path-planning with moving obstacles and goals;

U.S. Pat. No. 5,870,303, entitled: Method and apparatus for controlling maneuvers of a vehicle;

U.S. Pat. No. 5,808,887, entitled: Animation of path-planning;

U.S. Pat. No. 5,696,674, entitled: Computer animation of planned path in changing space;

U.S. Pat. No. 5,539,645, entitled: Traffic monitoring system with reduced communications requirements. The above patents describe a process of path-planning in which an optimal path is determined by propagating cost waves through a configuration space by budding, using a space-variant metric. Budding refers to a process of calculating a total cost to reach the goal from each neighbor of a given node in a configuration space (or from the start to the neighbors of a given node). The budding is always performed for the neighbors of the node lying on the lowest cost path found up to that point. Thus, the process of budding may be described as propagating waves of lowest cost through the configuration space. This process may be applied in the present case since the optimal bit allocation problem defines a path-planning problem in a configuration space such as described in the above references.

To understand how optimization of quantizers in the environment of compression gives rise to a path-planning problem, consider a simple image compression problem. An image is divided into two halves, a left side and a right side according to some arbitrary compression protocol. According to the some arbitrary requirement, the problem is to choose the quantizers such that the image can be compressed to some given number of bits N with a minimum distortion of the image. Each side has a choice or quantizer: one choice representing luminance of the pixels with a single bit and another choice representing luminance of the pixels with two bits. With the one bit quantizer, the image distortion may be higher, but the amount of data required is lower. With the two bit quantizer, the distortion is lower, but the amount of data required is higher.

The optimization problem, for the above example, is simply a problem of finding the quantizer for each side of the image that insures the total number of bits is below N and minimizes the distortion. The distortion can be calculated according to known techniques. These techniques have evolved to take account of human perceptual biases so that the types of distortion that are less apparent to human observers are less heavily weighted in calculating overall image (or video) distortion than the types of distortion that are more conspicuous to human observers. Other numerical techniques such as mean-square error can also be employed. The issue of calculating distortion of an image is not developed further in this specification because the topic is a mature technical subject and not directly related to the invention.

One can imagine that if the left side of the image is mostly very dark, like an image of a door open to an unlit room showing an empty space on the left side, little is lost if the left side of the image is encoded using a single bit, which would represent the luminance of the pixels as either black or white. On the right side, the features of the door may be represented to better advantage by using the four tier graded luminance possible with a two bit representation of luminance. So clearly, using 1 bit for the left side pixels and 2 bits for the right side pixels results in less distortion than the reverse. The path-planning problem can be represented by map of nodes, where each node represents an assignment of a quantizer to a region of the image. The path has to go through one, and only one node corresponding to the left side of the image and one and only one node corresponding to the right side of the image. Each choice of how to plot the path results in a certain cost in terms of the number of bits required to store the pixels of the image region and in terms of the distortion in the compressed image. In this example, the path optimization problem is to choose the path that results in the lowest distortion while remaining below the maximum number of bits permitted, N.

A* path-planning addresses this path optimization problem beginning with the initialization of an algorithm with a topology that contains a starting point and an ending point. In the simple example, this would be two additional nodes beyond the ones previously mentioned. The nodes are interconnected with allowed paths. In the simple image compression example problem, the node representing the one and two bit quantizers for the left side of the image would not be connected, but the node representing the one bit quantizer for the left side would be connected to both nodes representing the quantizers for the right side. The A* algorithm, metaphorically, takes one step out from each node to all the adjacent nodes and calculates the total distortion and total bits required resulting from the steps so far. This is called "expanding" the neighboring nodes or propagating waves of least (distortion) cost. The total distortion values are managed by a computer software element known as a heap. The heap sorts the total distortion values so that the lowest distortion is always on top of the heap. Once all neighboring nodes are expanded, the algorithm moves to the node corresponding to the value on the top of the heap (i.e., the lowest node whose selection gives rise to the lowest distortion), if the total number of required bits is lower than the limit imposed by the problem. If the total number of bits is greater, then the next "top of heap" node is chosen. The algorithm then expands all the new neighbors, storing the cumulative distortion, which includes the distortion corresponding to the quantization value defined by the current node, in the heap. It then selects the node sitting at the top of the heap and expands its neighbors. This may mean that the current node is one that was expanded previously or it may mean that the current node will push the path further along the node selected for expansion in the first round. This process continues until the end node is reached at which point, the process may be declared completed. This provisional final result is typically a near-optimum path and can be used for the final result if there is insufficient time in a time-constrained problem to expand new paths. Otherwise, the near-optimum can be put aside and additional paths expanded until, possibly, another path with a distortion that is lower than the current optimum path is found. There can be no improvements to the path once the distortion value at the top of the heap is equal to the near-optimum distortion at the goal. Thus, an exhaustive search is not required, while guaranteeing that the optimum path is found.

Note that in the trivial image compression problem discussed above, the distortion corresponding to a node was not affected by whether any other node was chosen as a point along the path. In more realistic rate distortion compression problems, dependence usually does happen. Such quantizers are called dependent quantizers. For example, this can happen when pixel values are encoded differentially so that the quantizer in one region affects the distortion results obtained with a given quantizer in an adjacent region. The inter-relationship or dependency is provided by the graph structure. Also note that the term "quantizer" is used in the present specification to refer to all methods used for modeling an image or video sequence in the process of encoding its data, not just the quantizing of magnitude scales. So, for example, it may refer to the choice of quad-tree decomposition of an image or video frame, for example for motion compensation modeling. Also, of course, the invention contemplates various ways of modeling images and video sequences as long as the optimization problem that defines a path-planning problem has certain characteristics. These include that the path space is defined by a directed graph consisting of nodes with allowed transitions therebetween, that a cost be calculatable for transitions, that the cost accumulate (either increasing or decreasing) monotonically or remain zero between transitions and the cost be a function of prior nodes evaluated. If these requirements are met, then the A* algorithm can be implemented and the above-discussed results obtained automatically.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
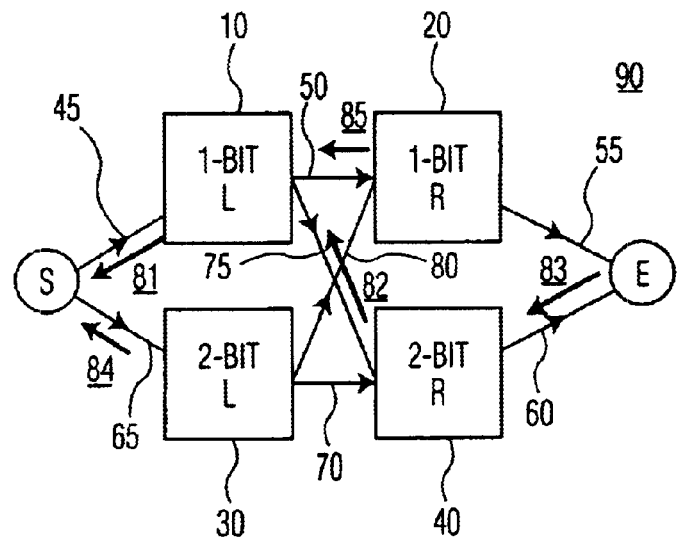
FIG. 1 is an illustration of a path optimization problem for a hypothetical image compression scheme for purposes of illustrating the invention.

Referring to FIG. 1, a graph 90 resulting from the trivial example discussed in the summary of the invention section is illustrated. Blocks 10, 20, 30, and 40 represent the nodes. Block 10 represents the choice of the one bit quantizer used to encode the bits on the left side and block 20, the choice of the one bit quantizer to encode the bits on the right side. Block 30 represents the choice of the two bit quantizer used to encode the bits on the left side and block 40, the choice of the two bit quantizer to encode the bits on the right side. A starting node S and an end node E are also defined to indicate the starting node and the ending node of the optimization problem respectively. Each node, including 10–40, S and E is linked with another node by a directed line segment, also called a "transition" in some of the art. The lines indicating transitions 45, 50, 55, 60, 65, 70, 75, and 80 are directed such that progress is only permitted in the left-to-right direction as indicated by the arrows. Each node 10–40 has associated with it a distortion cost. As discussed in the summary section, each node 10–40 also has associated with it a bit requirement for encoding the corresponding image portion (L, R). The total bits required so far are also stored within the node.

After initializing the graph 90 and a heap (not shown) (with the starting node S, S having zero distortion (cost) and zero "bit requirement"), the A* algorithm begins by calculating the distortion and bit requirement (i.e., sum of distortion from S to the node) for each of the neighboring nodes 10 and 30. If the total bit requirement for a node is below the stipulated ceiling, then the total distortion (and pointer to the node) is placed in the heap, with the one corresponding to the lower total distortion rising to the top. If the node corresponding to the lower distortion is node 10, then its neighbors 20 and 40 will be expanded next; that is, the distortion and bit rates corresponding to each calculated and added to the base distortion and bit rate corresponding to node 10. Thus, node 20 will have a distortion which is the total of nodes 10 and 20 and S and similarly for node 40. Also, the totals for the bit rates will be calculated as well. If both are below the bit rate budget, the values of the total distortions will be placed on the heap. If not, only the distortion value that corresponds to the path within the bit budget will be placed in the heap. Within each node, a pointer to the best "parent" node is maintained. The parent is the node that imparted the lowest cost. In this example, parents are to the left of each node, and are indicated as 81 to 85. The final path is traced from E to S and is then reversed to give the optimal path. The lower of the two final results, assuming both are within the bit budget, will be the provisional optimized path.

Recall that the optimization problem can have a time limit for the compression operation. If there is time left in the time limit, then the neighborhood of node 30 may be expanded if this total distortion is less than the distortion at E. In the hypothetical example, the rate and distortion corresponding to the transitions 70 and 80 are identical to those for the transitions 50 and 75, but in general this may not be the case, depending on the compression problem. The process would continue as for node 10 with the result that the values at nodes 20 and 40 are not improved, and therefore they are not added to the heap. The lower total distortion node—let Node 40 be lower for this example—will be next to expand. Since 60 has transition cost (zero), then E is reached. This may signal the end of the search. If there were other values in the heap, having values less than Node 40, the search could proceed further. Note that in this case, the end node is a stand-in and transitions 55 and 60 are not be associated with any incremental rate or distortion, so the search goes directly to E when either node 20 or 40 is reached. After as many searches as can be done—in the present case there is only one expansion possible for each of the two possible beginning transitions—the parent node giving the lowest total distortion cost is chosen.

Figure 2:
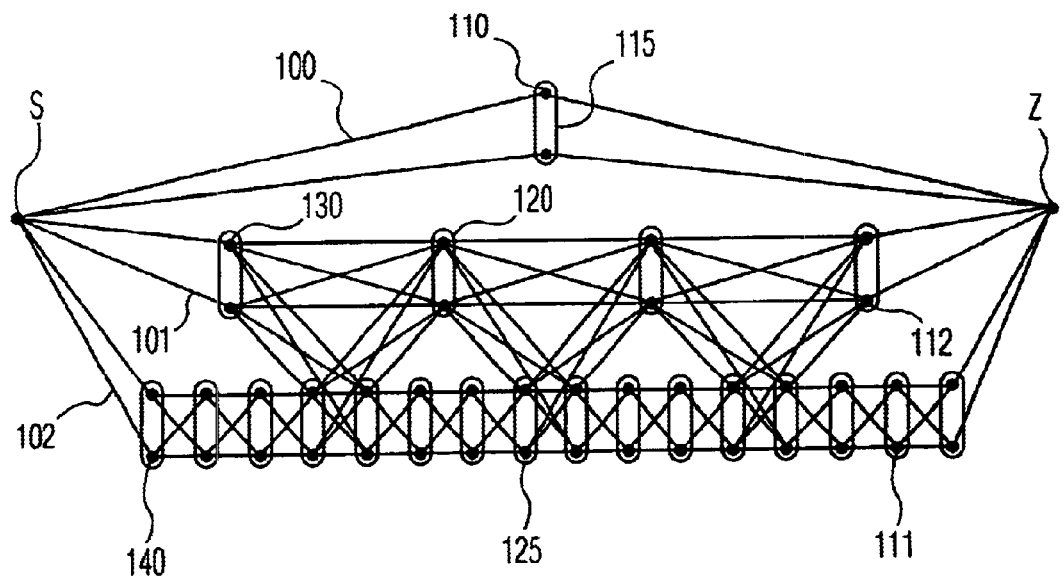
FIG. 2 is an illustration of a first stage in the solving of an exemplary path-planning problem for purposes of discussing the present invention.

Referring to FIG. 2, which is from U.S. Pat. No. 5,778, 192 for "Method and device for optimal bit allocation between different sources of information in digital video compression," the entirety of which is hereby incorporated by reference as if fully set forth herein, a lowest cost path search problem identified with video compression is illustrated. The diagram of FIG. 2 represents a multi-level trellis that represents the allowed choices of quantizers for a 32 pixel by 32 pixel image block in which the block is segmented using a quadtree structure that is permitted to be developed down to level 3. That is, segments of 8 by 8, 16 by 16, and 32 by 32 are permitted. The quadtree structure corresponds to the white ovals 115, 120, and 125, each of which designates a set of nodes, for example 110, 130, and 140, which are indicated by the black dots. Note that only representative ones of the ovals and nodes are labeled with reference numerals to keep the drawing from being overly busy. Although only two nodes 110, 111, 112, 130, and 140 are shown in each set, the number can be any number of nodes, each corresponding to the number of admissible state values for the individual blocks at different levels. In other words, each node corresponds to a choice of quantizer for a particular aspect of the video stream. The scheme discussed in the above-identified patent is a motion compensation scheme. In that scheme, the auxiliary nodes, start S, and termination Z, are used to initialize the differential pulse code modulation (DPCM) of the motion vectors and to select the path with the smallest total cost from a rate/distortion standpoint.

As discussed in the above patent, the goal is to identify a path through the trellis that corresponds to the lowest total rate/distortion cost. The path must be made up of allowed transitions, e.g., 100, 101, and 102. This amounts to the problem of allocating an available bit budget among various different kinds of data. In the example from the above-mentioned patent, there are three critical types of data involved in a particular kind of compression scheme: segmentation, motion vectors, and prediction error. For purposes of understanding the invention, the details of the compression scheme are not important because many compression schemes give rise to such graph search problems, even though many may not be representable as a trellis. The complex optimization problem in all cases results because of the difficulty presented by the fact that the amount of distortion suffered by forsaking one bit for a particular type of data is not equivalent to that suffered by the forsaking of another bit representing some other type of data. The basic objective is to optimally encode a given frame or video sequence in the rate-distortion sense. That is, optimally allocate bits, given bit budget of a given the encoding scheme, that will result in the smallest possible distortion or vice versa. For purposes of the invention, the particulars of the encoding scheme and the particulars of the graph search problem resulting from it are unimportant as long as the graph search problem has the following characteristics:

1. The topology of the path space defines a directed graph consisting of a set of nodes with some allowed transitions therebetween. Some nodes may not be reachable from other nodes and cyclic connections are permissible.
2. A cost, to be optimized, can be defined for each transition. The cost must be non-negative.
3. The cost at each node may be a function of prior nodes included in the path.
4. The cost must monotonically increase or decrease.

There must be a start and at least one goal or terminating condition, but these can be arbitrarily defined as in the simple example discussed above.

Figure 3:
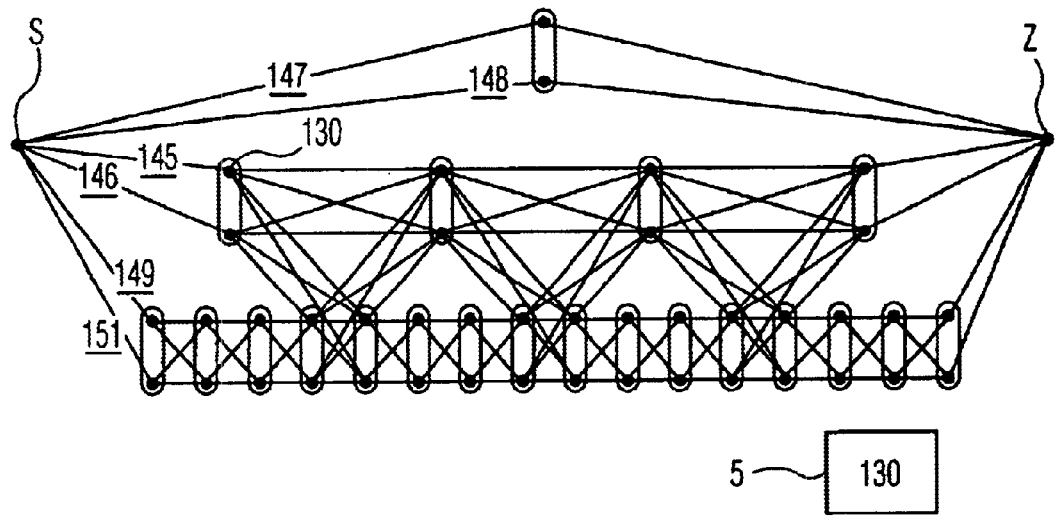
FIG. 3 is an illustration of a second stage in the solving of the path-planning problem of FIG. 1.
Figure 4:
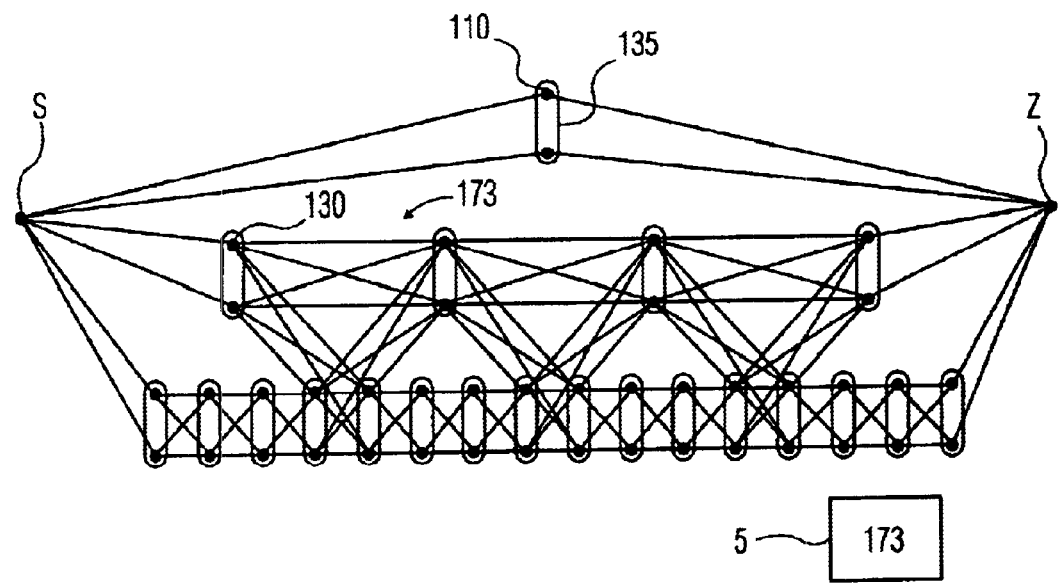
FIG. 4 is an illustration of a third stage in the solving of the path-planning problem of FIG. 1.
Figure 5:
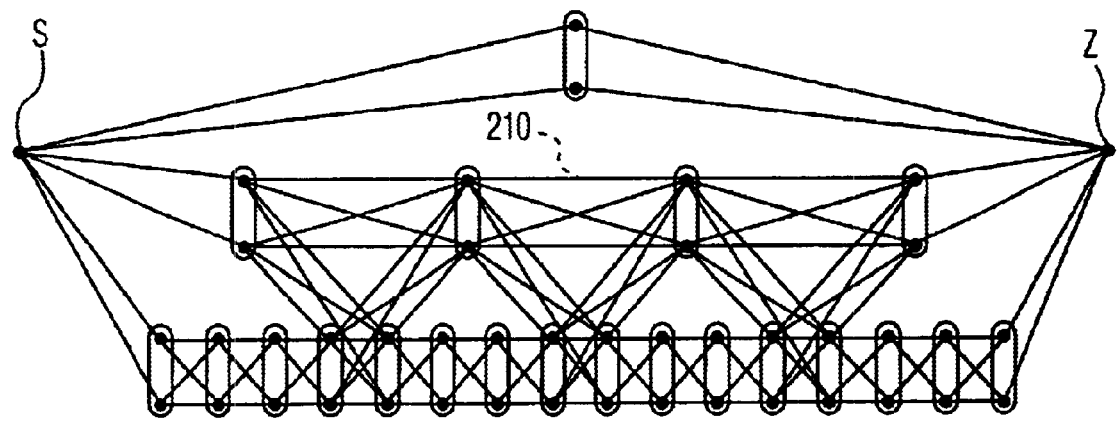
FIG. 5 is an illustration of a final stage in the solving of the path-planning problem of FIG. 1.

Referring now to FIG. 3, the neighborhood of the starting node S is expanded first. This is the first step in the stepwise propagation of a least-cost wave. A bit rate and distortion is calculated for each transition 147, 148, 145, 146, 149, and 151, which encompasses the neighborhood of the starting node S. All distortion values are placed in the heap 5. The rate is also calculated, and is stored in each node. A pointer from each node to the start is also added. Assuming the transition 145 to the node 130 corresponds to the lowest distortion cost that remains under the bit rate ceiling, the node 130 will rise to the top of the heap causing the neighborhood of node 130 to be expanded as shown in FIG. 4 and costs and rates calculated for each of a new set of transitions 173. Further, the "best path" parent is also identified. In this figure, we omit the parent arrows for graphical simplicity. This process continues until, as illustrated in FIG. 5, a final optimized path 210 that reaches the end node Z is found. Again, the process can continue, beginning with the lowest remaining total cost node, to find a more global optimum, unless some time, other constraint prevents it, of it the total cost is not less than that of Z.

Figure 6:
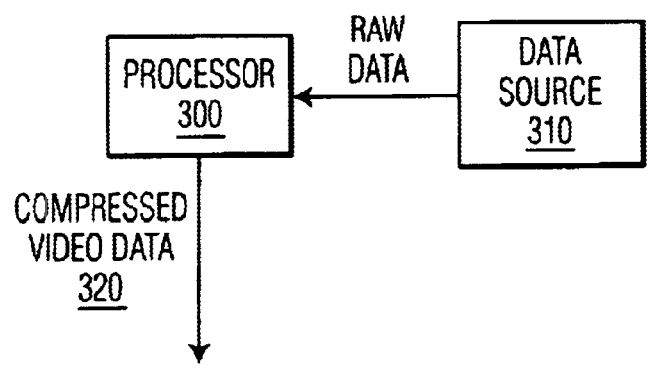
FIG. 6 is a block diagram representing an apparatus for performing data compression according to an embodiment of the invention.

Referring to FIG. 6, a device for implementing the processes on a data stream is illustrated. A data source 310 applies a data stream to a processor 300 that is programmed to implement a compression algorithm optimizing quantizers in accord with the invention. The processor then outputs a compressed video data stream 320.

Figure 7:
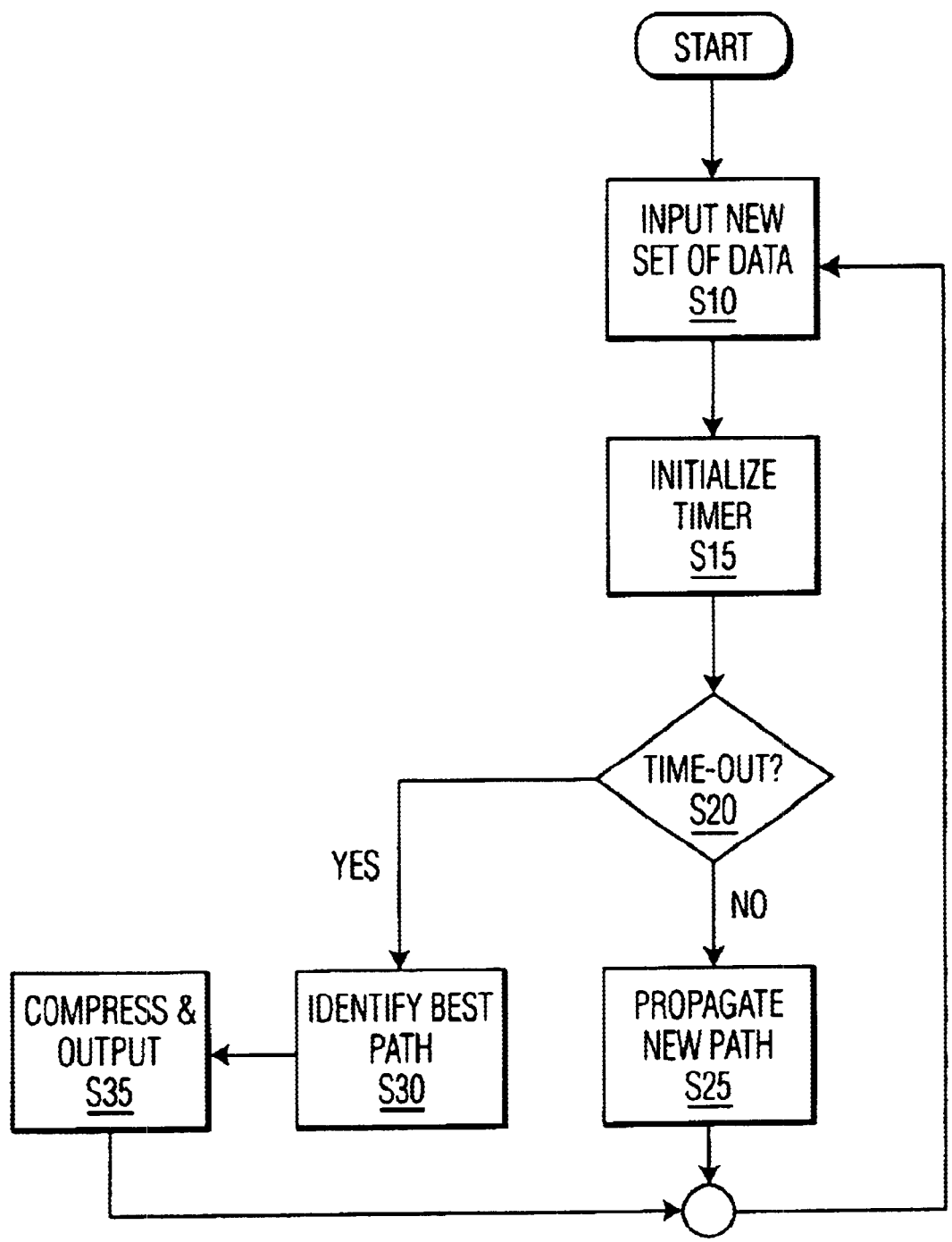
FIG. 7 is a flow chart representing a method for performing compression according to an embodiment of the invention.

Referring to FIG. 7, a flow chart illustrates a process in which a data stream is compressed in an environment that imposes a time limit, or processing resource limit, on the compression process. A new set of data is accepted in step S10. For example, a video frame could be accepted for processing in step S10. A timer is then initialized in step S15 (or a processing resource quantifier). The timer is then checked for expiration in step S20 and if there is time (or processing resources) remaining, a new optimal path is propagated according to the optimal path algorithm discussed above in step S25. Flow then returns to input a new set of data at step S10. If the timer times out in step S20, a best (least cost) path among the candidate paths found in each iteration of step S25 is identified in step S30. Then, in step S35, the data is compressed according to the quantizers identified in step S30, the compressed data is output, and the process flows back to step S10.

What is claimed is:

1. A method of compressing a video or image, comprising the steps of:

defining a configuration space that models an optimal bit allocation problem of a data compression process, the configuration space defining nodes and transitions between the nodes, the nodes corresponding to a selection of respective quantizers for respective features of a data stream, a path defined by a set of transitions each connected at respective ones of said nodes to another one of said set of transitions, said path joining a start node and an end node and having a total cost corresponding to a sum of costs of said transitions of said set of transitions;

propagating least-cost waves through said configuration space by budding, responsively to a space-variant metric, such that a first path of lowest found cost is identified through said configuration space joining said start node and said end node; and applying the quantizers corresponding to said nodes lying on said first path to a first set of data to be compressed by said data compression process.

2. A method as in claim 1, further comprising the step of repeating said step of propagating such that a second path of lowest found cost is identified and repeating said step of applying in compressing a second set of data to be compressed by said data compression process.

3. A method of compressing a video or image, comprising the steps of:

defining a configuration space that models an optimal bit allocation problem of a data compression process, the configuration space defining nodes and transitions between the nodes, the nodes corresponding to a selection of respective quantizers for respective features of a data stream, a path defined by a set of transitions each connected at respective ones of said nodes to another one of said set of transitions, said path joining a start node and an end node and having a total cost corresponding to a sum of costs of said transitions of said set of transitions;

propagating least-cost waves through said configuration space by budding, responsively to a space-variant metric, such that a first path of lowest found cost is identified through said configuration space joining said start node and said end node;

repeating said step of propagating such that a second path of lowest found cost is identified; and comparing said lowest found costs of the first and second path and applying the quantizers corresponding to said nodes lying on a lower cost one of said first and second paths in compressing input data to be compressed by said data compression process.

4. A method as in claim 3, wherein said steps of repeating and comparing are performed conditionally based upon an allowed time interval for finding an optimal least cost path.

5. A method as in claim 3, wherein said input data includes video data and said cost is one of a distortion of images of said video data and a bit rate of a data stream resulting from said step of applying.

6. A data compression device, comprising:

a processor connected to receive a raw data stream and output a compressed data stream;

said processor being programmed to determine optimal quantizers by budding nodes of a configuration space that models an optimal bit allocation problem of a data compression process, the nodes corresponding to a selection of respective quantizers for respective features of a data stream, a path defined by a set of transitions each connected at respective ones of said nodes to another one of said set of transitions, said path joining a start node and an end node and having a total cost corresponding to a sum of costs of said transitions of said set of transitions;

said budding including propagating least-cost waves through said configuration space responsively to a space-variant metric such that a path of lowest found cost is identified through said configuration space joining said start node and said end node;

said processor being programmed to apply the quantizers corresponding to said nodes lying on said path of lowest found cost in compressing said raw data.

7. A data compression device, comprising:

a processor connected to receive a raw data stream and output a compressed data stream;

said processor being programmed to determine optimal quantizers by budding nodes of a configuration space that models an optimal bit allocation problem of a data compression process, the nodes corresponding to a selection of respective quantizers for respective features of a data stream, a path defined by a set of transitions each connected at respective ones of said nodes to another one of said set of transitions, said path joining a start node and an end node and having a total cost corresponding to a sum of costs of said transitions of said set of transitions;

said budding including propagating least-cost waves through said configuration space responsively to a space-variant metric such that a first path of lowest found cost is identified through said configuration space joining said start node and said end node;

said processor being programmed to further propagate further cost waves to identify a second path of lowest found cost and to compare said lowest found costs of the first and second path and apply the quantizers corresponding to said nodes lying on a lower cost one of said first and second paths in compressing said raw data.

8. A method of allocating bits for optimal rate/distortion performance in digital data compression, comprising:

determining a set of interconnected choices of quantizers for each of a set of portions of a data stream in accord with said digital data compression;

defining a starting one of said set of interconnected choices and propagating least-cost waves beginning with said starting one of said set of interconnected choices until a path defining all necessary quantizers is found; and implementing a data compression based upon at least some of the quantizer choices defined by said path.

9. A method as in claim 8, wherein said step of determining includes determining a set of interconnected choices of quantizers for each of a set of portions of a video data stream.

10. A method as in claim 9, wherein said quantizers include a quadtree decomposition of a video image.

11. A method as in claim 9, wherein said quantizers include a quantizer for representing a motion vector field.

12. A method as in claim 8, wherein said quantizers include a quantizer for quantizing differences between values in said data stream.

13. A device for allocating bits for optimal rate/distortion performance in digital data compression, comprising:

a processor linked to a data stream and programmed to determine a set of interconnected choices of quantizers for each of a set of portions of a data stream in accord with said digital data compression;

said processor being further programmed to define a starting one of said set of interconnected choices and to propagate least-cost waves beginning with said starting one of said set of interconnected choices until a path defining all necessary quantizers is found; and said processor being further programmed to implement a data compression process based upon at least some of the quantizer choices defined by said path.

14. A device as in claim 13, wherein said data stream is a video data stream.

15. A device as in claim 14, wherein said quantizers include a quadtree decomposition of a video image.

16. A device as in claim 14, wherein said quantizers include a quantizer for representing a motion vector field.

17. A device as in claim 13, wherein said quantizers include a quantizer for quantizing differences between values in said data stream.

18. A device for allocating bits for optimal rate/distortion performance in digital data compression, comprising:

a processor linked to a data stream and programmed to determine a set of interconnected choices of quantizers for each of a set of portions of a data stream in accord with said digital data compression;

said processor being further programmed to define a starting one of said set of interconnected choices and to propagate least-cost waves beginning with said starting one of said set of interconnected choices until a first path defining all necessary quantizers is found;

said processor being further programmed to propagate least-cost waves beginning with a lowest cost incomplete path until a second path defining all necessary quantizers is found;

said processor being further programmed to implement a data compression process based upon at least some of the quantizer choices defined by a lowest cost one of the first and second paths.

19. A device as in claim 18, wherein said data stream is a video data stream.

20. A device as in claim 19, wherein said quantizers include a quadtree decomposition of a video image.

21. A device as in claim 19, wherein said quantizers include a quantizer for representing a motion vector field.

22. A device as in claim 18, wherein said quantizers include a quantizer for quantizing differences between values in said data stream.

* * * * *